United States Patent [19]

Bouchard et al.

[11] Patent Number: 5,528,920
[45] Date of Patent: Jun. 25, 1996

[54] PROCESS FOR LAMINATING A THIN FILM OF LIHIUM BY CONTROLLED DETACHMENT

[75] Inventors: Patrick Bouchard, Fleurimont; Paul-Emile Guerin, Cap-de-la-Madeleine; Guy St-Amant, Trois-Rivières; Guy Laroche, Deauville, all of Canada

[73] Assignee: Hydro-Quebec, Quebec, Canada

[21] Appl. No.: 273,759

[22] Filed: Jul. 12, 1994

[51] Int. Cl.[6] .................................................. B21B 39/08
[52] U.S. Cl. .................... 72/205; 72/39; 72/42; 72/46; 72/700
[58] Field of Search .................................. 72/39, 42, 46, 72/205, 700

[56] References Cited

U.S. PATENT DOCUMENTS

| 712,365 | 10/1902 | Dejey ........................................ 72/700 |
| 1,516,098 | 11/1924 | Heyer . |
| 3,721,113 | 3/1973 | Hovsepian . |
| 4,502,903 | 3/1985 | Bruder . |
| 5,102,475 | 4/1992 | Raymund et al. . |

FOREIGN PATENT DOCUMENTS 0146246  6/1986  European Pat. Off. .

Primary Examiner—W. Donald Bray
Attorney, Agent, or Firm—Oblon Spivak, McClelland, Maier & Neustadt

[57] ABSTRACT

A film of lithium capable for example of providing the anode of a polymer electrolyte battery is produced by laminating a lithium sheet between two working rolls. At the outlet, the film remains attached to one of the two rolls up to a given point of the circumference of the latter where it forms an angle of about 90° with the meeting point between the two rollers. A sufficient tension is thereafter exerted on the film, which in any case is inferior to the limit of elasticity of lithium, by pulling the film in order to detach it from the surface of the roller and usually so that the given point moves into an intermediate position between 90° and the meeting point, for example about 45°. The product obtained may also be used any time there is a need for a film of lithium having a thickness for example between 10 and 100 µm.

27 Claims, 1 Drawing Sheet

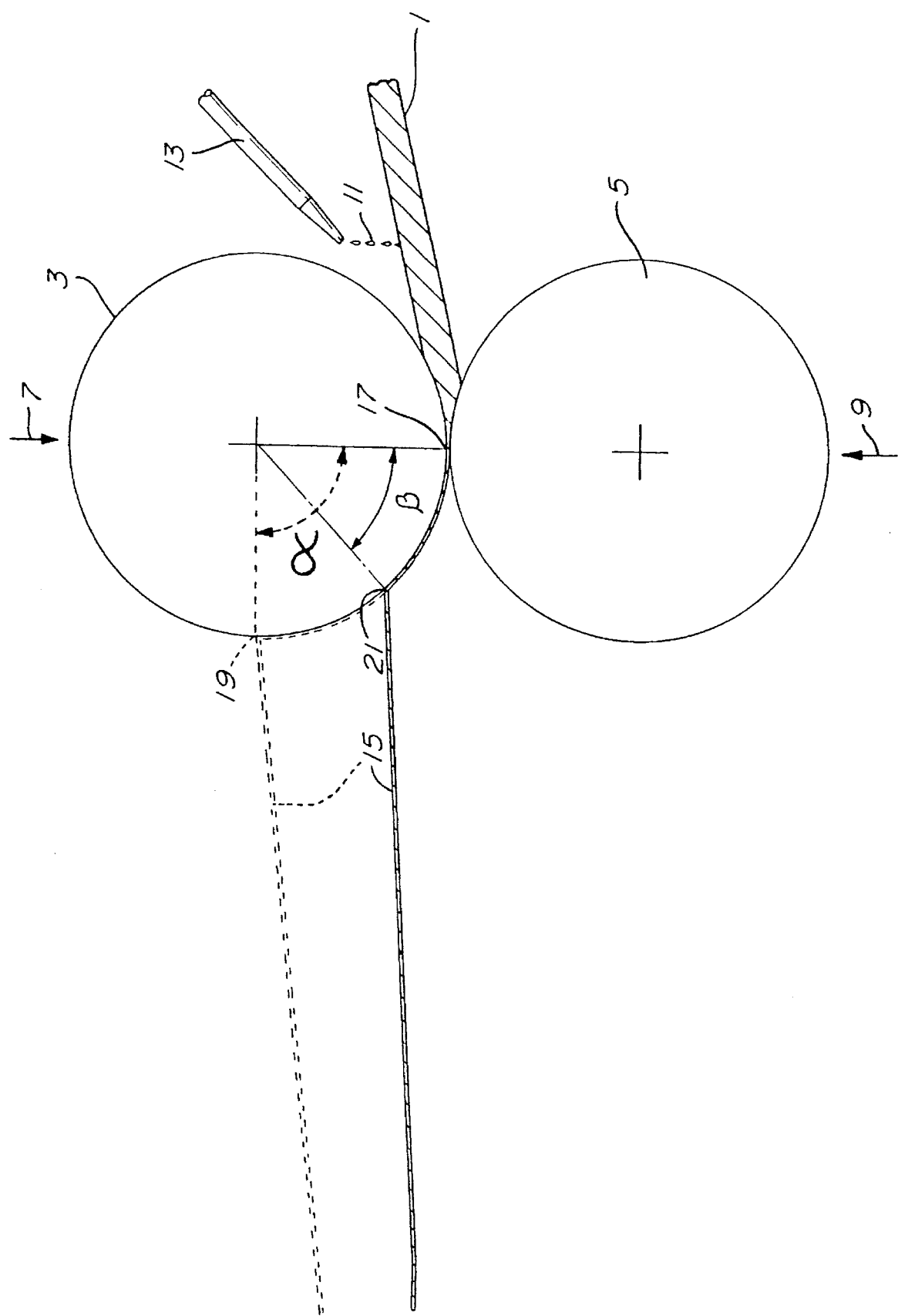

PROCESS FOR LAMINATING A THIN FILM OF LITHIUM BY CONTROLLED DETACHMENT

BACKGROUND OF INVENTION a) Field of the Invention

The invention concerns a process and an apparatus for laminating a film of lithium by controlled detachment. More specifically, the invention concerns a process and an apparatus adapted to give thin films of lithium, characterized in that at the outlet of the rolling mill following a single pass, the film which has been laminated from a sheet of lithium, remains attached to the surface of one of the working rollers up to a given point on a part of the circumference of the latter working roller, past the meeting point of the two rollers, where it is drawn at a tension which is lower than the limit of elasticity of the film, but which is sufficient for detaching it from the surface of the one working roller, thereby obtaining an extra thin film of lithium and enabling to shape the film. The film of lithium obtained in this manner may be used as such in an electrochemical cell.

b) Description of Prior Art

In developing lithium batteries, one must rely on a process for manufacturing thin lithium electrodes in the form of continuous films. The films of lithium, which are commercially available, do not meet the norms of quality, length and width, and especially of thinness required for assembling a lithium battery with a polymer electrolyte. Since thin lithium has a very weak mechanical cohesion, it cannot undergo sufficient tension to keep its shape unmodified, as it is the case with conventional laminating processes using more resistant metals.

Traditional laminating processes, for metals such as steel or aluminum, utilize the cohesive strength of the latter to give desired inherent flatness and thickness. Thickness mainly results from the pressure exerted between the working rollers, by the holding tension applied to the metal at the inlet of the rolling mill and the unwinding speed, while shaping is essentially obtained by the profile of the rollers which are mechanically and thermally shaped, as well as by means of the tension applied on the metal at the outlet of the rolling mill. For those familiar with the handling of $Li°$, it is obvious that $Li°$ cannot undergo such physical stresses. To reach the desired thickness, one may use the pressure of the rollers and the speed. However, because of its very low mechanical cohesion, $Li°$ may only bear a minimal holding tension at the inlet of the rolling mill.

There is thus a need for shaping a film of $Li°$, since traditional laminating processes do not permit to produce an ultra thin film of lithium. As a matter of fact, high tensions may not be used with lithium, at the outlet of the rolling mills, because of its low limit of elasticity (579.13 KPa).

A survey of the prior art, on the other hand, teaches that there is no practical method for producing ultra thin films of lithium.

Thus, U.S. Pat. No. 3,721,113, inventor Hovsepian, dated Mar. 20, 1973, describes the lamination of a film of lithium between two working rollers whose surface is made of a polymeric material and wherein the surface tension does not exceed 46 dynes per centimeter at 20° C.

U.S. Pat. No. 4,502,903, inventor Bruder, dated Mar. 5, 1985, describes a method of manufacturing a laminate of lithium on a conductive plastic by direct contact between a surface of lithium and a sheet of conductive plastic material.

U.S. Pat. No. 5,102,475, inventors Raynaud et al, describes the lamination of an alloy of magnesium lithium between two hard working rollers, to a thickness of 10 to 200 µm. To overcome the problem caused by the adhesiveness of pure lithium on the rollers, an alloy of lithium and magnesium is used.

European document 0 146 236 published on Apr. 26, 1986, inventors Barry et al, describes an electrode which is protected by means a material which is impermeable towards fluids and which is non porous.

There are thus a certain number of patents such as described above which describe lamination of metals, however, in spite of this, thin lithium is not commercially available below 40µ and with substantial width and length such as is required for a polymer electrolyte battery, for example in the form of rolls 30 meters long by 15 centimeters wide and 22 microns thick.

It is thus seen that the prior art does not provide a process which permits to obtain in a continuous manner, ultra thin films of lithium, by lamination, especially in a single pass, and that in addition, it does not show how to control the inherent flatness of the lithium obtained.

SUMMARY OF INVENTION

It is an object of the invention to overcome constraints of the prior art by proposing a method of providing a film of lithium at the outlet of the working rollers.

It is also an object of the invention to provide ultra thin films of lithium by continuous lamination, which are intended to constitute the anode of a polymer electrolyte battery.

The invention concerns a process for producing thin films of lithium, from a sheet of lithium preferably wound on a roller, in which the sheet of lithium which is wound on the roller is preferably unwound, it is fed between working rollers with a lamination lubricant to laminate the sheet into a thin film, and the thin film is thereafter rolled on a winding drum. The process is characterized in that the lamination is preferably carried out in a single pass, there are used working rollers having lamination surfaces made of a material to which lithium does not adhere, the lubricant is a volatile or non volatile lamination lubricant which is compatible with lithium. If the lamination lubricant is non volatile, it should be compatible with the operation of a cell if it has to remain on the lithium film. The lubricant should be such that the thin film produced at at the outlet of the working rollers, remains attached on the surface of one of the working rollers, to a given point on the working of the latter past a meeting point between the two working rollers so that an angle formed between the meeting point, the given point and the center of the working roller is not greater than about 90°, and the thin film obtained of the rollers thereafter drawn from the one working roller at a tension which is smaller than the limit of elasticity of the film of lithium, but is sufficient to detach the latter from the working roller at the one given point, and thereby obtaining a film of excellent inherent flatness.

The term compatible with lithium used in the present specification and in the claims means the absence of chemical reaction with lithium or a limited chemical reaction leading to the formation of a passivation film which is not detrimental to electrochemical exchanges at the lithium/electrolyte interface of a cell.

A sheet obtained by extrusion between 75 and 1000µ is preferably used. The sheet may even be obtained by extrusion immediately before lamination.

According to a preferred embodiment of the invention, the thickness of the sheet of lithium preferably obtained by extrusion, is between about 150 and 500μ, preferably about 200 to 300μ, and more specially 250μ.

Unwinding of the sheet of lithium is preferably carried out under a tension which is capable of converting the sheet into a film. Preferably, the sheet is laminated in a single pass so as to give a thin film of lithium whose thickness is between about 5 μm and about 100 μm, preferably between about 20 μm and about 30 μm.

According to another preferred embodiment of the invention, at the start of the operation, lamination unwinding of the thin film is initiated with a tension which enables to cause a detachment of the film from the surface of the working roller when the given point mentioned above defines an angle of about 90° with the meeting point and the center of the roller. The tension is thereafter increased so that this given point is moved into an intermediate position, such as one forming an angle of about 45°, intermediate between 90° and the meeting point. This aspect of the process is important to reach substantial lamination speeds (more than 20 to 50 m/min.), since it enables a control and optimization of the lamination parameters, such as the opening of the rollers, the compounding of the lubricant additive, the adjustment of the speed, by varying the peeling angle.

According to a preferred embodiment of the invention, a lamination lubricant is poured onto the sheet at the inlet of the two working rollers, the lamination lubricant preferably consists of a volatile organic liquid, preferably an aromatic liquid, for example toluene, in a manner not to leave any residue on the film, and is used in a sufficient quantity to provide a controlled adhesion of the film on said working roller. Preferably, the laminating lubricant is toluene.

The volatile liquid may also contain an additive which facilitates lamination. In this case, the liquid is preferably a mixture of hexanes and toluene and the additive is selected for its compatibility with lithium and so as not to be detrimental to the electrochemical operation of the cell, in which case the slightly volatile additive may remain on the surface of the anode of the cell. For example, this additive may be a polyoxyethylene distearate in which the polyethylene segment varies between 200 and 5000. Reference may for example be made to U.S. Ser. No. 08/273,756 filed of even date and relating to such additives. The lamination lubricant that is preferably used is one which is electrochemically compatible with lithium and the other components of a polymer electrolyte battery.

Normally, rollers in which the surface profile is lower than 1 μm are used,

Preferably, the operation of lamination is carried out in air containing at most 1% relative humidity.

According to another preferred embodiment of the invention, passing of the sheet in a rolling mill including at least two working rollers reduces the thickness of the sheet by about 90%. Preferably, the thin film exits from the rolling mill at a speed which may be up to 50 m/min., preferably at a speed up to 20 m/min., by utilizing the action of the peeling angle in order to optimize the lamination parameters, i.e. speed, formulation of the lubricant and opening of the rollers According to another preferred embodiment of the invention, the lamination rollers are made of polyacetal.

The lamination lubricant which is preferably used is one which is either volatile, or electrochemically compatible with lithium and with the other components of a polymer electrolyte battery in which case a lubricant residue may be left on the surface of lithium. For example, reference will be made to the U.S. Ser. No. 08/273.756 filed of even date and relating to such additives.

BRIEF DESCRIPTION OF DRAWINGS

The invention will be best understood by means of the annexed drawings given essentially by way of illustration but without limitation, in which:

the single figure is a schematic illustration of a lamination operation according to the present invention.

DESCRIPTION OF PREFERRED EMBODIMENTS

It will be seen that a sheet of lithium 1 of a thickness of about 150 micrometers mounted on an unwinding roller (not illustrated) is allowed to be passed between two working rollers 3 and 5 made of polyacetal. A sufficient pressure is applied on the two rollers in the direction indicated by arrows 7 and 9 in order to reduce the thickness of the sheet by about 90%. At the inlet of the sheet between the laminating rollers, a laminating lubricant 11 is poured, for example toluene from a pouring spout 13.

At the outlet of the two laminating rollers, the sheet of lithium is converted into a film 15 whose thickness is about 25 micrometers. On the other hand, it will be seen that the film 15 remains attached to the surface of the roller 3 from the meeting point 17 between the two rollers 3 and 5 up to a given limit point 19 on the circumference of the roller 3 forming an angle $\alpha$ of 90° with the meeting point 17.

The film 15 is thereafter rolled up on a winding roller (not illustrated) with sufficient tension, empirically determined in order that on the one hand the film 15 is detached from point 19 and is gradually brought to point 21 where the operation on the other hand is continued without any other change.

Normally, at point 21, the angle $\beta$ formed will be about 45° it being understood that this angle may vary depending on circumstances and the desired properties of the film of lithium 15.

The invention is also illustrated by the embodiments which follow given once again without limitation.

EXAMPLE 1

An extruded sheet of lithium 1, 250 micrometers thick and 57 mm wide is used as starting material. The latter is fixed to the unwinding roller, passed between laminating rollers 3 and 5 and wound on the winding roller. A pressure which is sufficient to thin down the film is applied on the laminating rollers. These rollers are made of polyacetal and have a diameter of 20 mm. Toluene 11 is added dropwise, onto the sheet, at the inlet of the rolling mill, at a flow rate of 8 ml/min. Toluene is previously dehydrated on a molecular sieve in order to give a water concentration lower than 10 ppm. At the start, the initial angle on roller 3 is 90°. Once the inherent flatness is adjusted, the angle is brought back to 45° by increasing the tension. The film of lithium is allowed to remain attached to the working roller at this angle in order to perfectly control the tension which is applied on the latter. At the same time, the speed is gradually raised to a maximum of 5 m/min. The pressure which is exerted on the rollers is adjusted so as to give in one single pass a film of lithium having a homogeneous thickness of 25 micrometers ±2 μm, and a few tens of meters long. It will therefore be seen that the operation may be carried out continuously without reject.

As a variant, during the operation, toluene is suddenly replaced with hexanes at the same flow rate. The thickness abruptly increases to 90 micrometers. The inherent flatness of the film becomes extremely bad which compels us to decrease the pressure which is exerted on the working rollers. The film thus obtained is not sufficiently thin and of good inherent flatness to control its detachment from one of the working rollers. The term inherent flatness, designates the even shape of the film as opposed to its profile or its thickness.

It will therefore be seen that hexanes as used in the prior art does not have the required lubricating properties to be used alone in this process for producing a continuous film of thin lithium in a single pass.

EXAMPLE 2

A continuous extruded sheet of lithium 250 micrometers thick and 143 mm wide is thinned down by means of said lamination process. The film is mounted on the apparatus between the working rollers. The pressure on the rollers is increased in order to thin down the film by about 90%. A lubricant is added onto the film of lithium at a rate of 6 ml/min. This lubricant is made of a mixture of solvents to which there is added a lamination additive, comprising dry hexanes and toluene in a ratio of 9:1 and 0.2% p/p POE 200 distearate of formula:

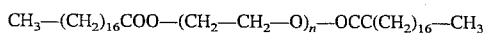

where n is selected so that the polyether segment has a molecular weight of 200.

This additive enables to increase the lamination speed to 200 m/min. and to give a thin film of lithium of excellent quality, which is electrochemically compatible when used in a polymer electrolyte cell. By means of the same process, it has been possible to obtain continuous films more than 300 meters long.

EXAMPLE 3

This example illustrates a lamination in continuous and in a single pass, of a film of lithium less than 30 micrometers ($\mu$). The device used is the one described in FIG. 1 and the lamination is carried out in an anhydrous atmosphere containing less than 1% relative humidity. The rollers consist of polyacetal and have a diameter of 20 mm; the starting lithium consists of an extruded sheet 250 micrometers ($\mu$) thick. The solvents and an additive if needed, are previously dehydrated on a molecular sieve in order to give a concentration of water lower than 10 ppm.

As a first step, an attempt is made to continuously laminate a lithium sheet 57 mm wide and to thin it down in a single pass to 25$\mu$. When no lubricating liquid is used during the lamination, lithium immediately adheres to the rollers and the process does not operate; with the addition of hexane, it is impossible to be successful with the lamination unless the rate of thinning down of the sheet is considerably reduced. At the best, it was possible to obtain a film of lithium 90$\mu$ in a single pass in which the inherent flatness is extremely bad. Consequently, hexane, as used in the prior art, does not have sufficient lubricating properties to be used alone in a continuous process in one single pass to give a lithium less than 25$\mu$.

When the lamination is carried out with a lubricating liquid consisting of toluene, which is added at the rate of 8 ml/min., on an extruded sheet 57 mm wide, continuous lamination of lithium 225$\mu$ becomes possible and the maximum speed that can be achieved is 5 m/min. by allowing the laminated film to be attached to the upper roller at an angle of 45° with respect to the given point, the meeting point and the center of the roller, as illustrated in FIG. 1. This operation enables a perfect control of the tension applied on the free film and gives a lithium of excellent inherent flatness. Lengths of twenty or so meters may thus be obtained continuously. A rapid changeover during the operation from toluene to hexane, instantaneously causes the thickness to increase to about 90$\mu$ and a lithium of very bad inherent flatness is obtained.

The interest of adding lamination additives according to this invention is established by utilizing an extruded lithium 250$\mu$ thick and 143 mm wide. The device of the previous tests is used with a solution of hexane and toluene in a ratio 9:1 containing a POE distearate 200 (mol. wt.) at a concentration of 0.2% p/p. An excess of lubricating solution is added onto the extruded sheet of lithium at the rate of 6 ml/min. Under these conditions a film of lithium 22$\mu$ thick of excellent inherent flatness is obtained in a single pass at a lamination speed of more than 20 m/min. This process which is still not optimized, also enables to produce rolls of laminated films more than 300 meters long in which the thickness is constant at 2$\mu$ more or less. The following tests are very reproducible from one test to the other and the rates of loss or interruptions of the process are insignificant; more important productions were thus possible from longer rollers of extruded lithium or from direct feed to the rolling mill from an extruder.

EXAMPLE 4

Lithium 22$\mu$ produced by utilizing the additive of example 3 is used as the anode of a lithium cell operating at 60° C. The visual aspect of lithium is excellent, it shines without any coloring, and the surface profile obtained with Dektak® (model 3030 of VEECO, U.S.A.) fluctuates within 3$\mu$. For this laboratory test, the lithium sheet is lightly applied under pressure over a thin sheet of nickel to ensure current collection. The electrolyte used consists of a polymer electrolyte consisting of a copolymer of ethylene oxide and methylglycidyl ether and a lithium salt, $(CF_3SO_2)_2NLi$ in a ratio of oxygen to lithium (O/Li) of 30/1. The composite cathode consists of vanadium oxide and carbon black dispersed in the polymer electrolyte and has a capacity of 5 $C/cm^2$. The active surface of the battery thus constituted is 3–9 $cm^2$. The initial impedance of this battery at 60° C. is 15$\Omega$, i.e. it is equivalent to or lower than the best lithium commercially obtained. The cycling properties of this battery utilizing the lithium of example 3 are excellent after 100 cycles and the rate of utilization of the battery remains at least equivalent to similar batteries made with commercial lithium, or about 90% of the initial value stabilized after 10 cycles. This example confirms that the presence of non-volatile POE distearate which is left on the surface of lithium is not harmful to the appropriate operation of the cell. This result is explained by the electrolytic conductivity resulting from the presence of the additive solvating POE segment and by the chemical compatibility of the latter with lithium. In an independent test, the electrolytic conductivity of this additive, when the $(CF_3SO_2)_2NLi$ salt content is 30/1, is about $1\times10^{-5}$ S.cm.

EXAMPLE 5

In this example, we have evaluated, at a temperature of 25° C., the impedance of symmetrical batteries Li°/polymer electrolyte/Li° made from laminated lithium without additives and covered with an excess of various possible lubricating materials.

The quantity of lubricant used per surface unit of lithium is 0.03 mg/cm$^2$. This value corresponds to an excess of lubricant with respect to what is required for the lamination according to example 3, but the aim is to amplify and accelerate the electrochemical effect of the various additives. The impedance values are given for batteries in which the active surface is 3.9 cm$^2$. The electrolyte of example 4 is also used to produce batteries which are assembled by hot pressing under vacuum.

For the various materials used, the results are the following:

|  | Impedance |
|---|---|
| 1) POE distearate 200 (mol. Wt) | 113 Ω |
| 2) POE distearate 600 (mol. Wt.) | 113 Ω |
| 3) Pure stearic acid | 840 Ω |
| 4) Pure POE of molecular weight 500 | 139 Ω |

The values observed confirm the influence of the POE segment on the electrolytic conductivity of the additives and enable to conclude that stearic acid often used as lamination lubricant of conventional metals is incompatible with lithium for use in an electrochemical cell.

EXAMPLE 6

In this example a comparison is made of the effect of various lamination additives known for their lubricating properties on the efficiency of the lamination in one single pass of lithium 255μ to about 30μ.

To carry out these comparisons, the lamination is initiated under conditions similar to those of example 3 by utilizing POE distearate 200 as additive. During the lamination, the composition of the solution is changed by replacing the POE distearate with the other additives. The effect of the addition is immediately observed by following the thickness of the laminated film of lithium, its inherent flatness and its visual appearance. When the solution containing the distearate is replaced by a solution of ethyl stearate at a concentration of 0.15% p/p, the thickness of lithium suddenly rises from 40 to 90μ and with a loss of inherent flatness of the laminated lithium.

When using a laminating solution based on EPAL® 1012 (linear alcohol in C$_{10}$) of Ethyl Corporation, as laminating lubricant, it is noted that the thickness of the laminated lithium progressively rises beyond 65μ and the lithium obtained becomes sticky against the center of the rollers while the sides become irregular (undulations). When using a laminating solution based on POE 5000 in toluene, a rapid rise of the thickness of the laminated lithium to 90μ with loss of inherent flatness is noted.

These tests illustrate the importance of the formulations based on stearates which act as lubricants and include solvating functions, for example those based on POE. These preferred but non limiting formulations are also superior to additives based on pure POE in terms of the process of lamination even if the properties of electrolytic conductors are in this case adequate as illustrated in example 5.

We claim:

1. A process for producing a thin film of lithium from a sheet of lithium, comprising:

applying a lamination lubricant to one side of a sheet of lithium at the inlet of two working rollers, passing said sheet of lithium together with said lubricant between the meeting point of two working rollers to reduce the thickness of said sheet of lithium, forming a lithium film of reduced thickness which remains attached to the surface of one of said working rollers up to a given point on the circumference of said roller, removing said lithium film of reduced thickness from the surface of said working roller at said given point by applying a given tension to said lithium film of reduced thickness, forming a thin film of lithium, collecting said thin film of lithium by winding onto a winding roller, wherein;

said working rollers comprise surfaces made of a material to which the lithium does not adhere and;

said lubricant is compatible with lithium and causes said lithium film of reduced thickness to remain attached to the surface of said one working roller up to said given point, said given point being determined by an angle formed by said meeting point, said given point and the center of said one working roller, being an angle which does not exceed 90°, said tension being sufficient to detach said lithium film of reduced thickness from said one working roller and which does not exceed the elastic limit of said thin film of lithium.

2. The process according to claim 1, comprising unwinding said thin film of lithium from said winding roller and thereafter feeding same into said working rollers.

3. The process according to claim 1, wherein said sheet is obtained by extrusion to a thickness between 75 and 1000μ.

4. The process according to claim 1, wherein the thickness of said sheet of lithium is between 150 and 500μ.

5. The process according to claim 4, wherein the thickness of said sheet of lithium is between 200 and 300μ.

6. The process according to claim 3, wherein said unwinding step is carried out under tension.

7. Process according to claim 1, wherein said sheet is obtained by extrusion.

8. Process according to claim 1, wherein said lamination lubricant is volatile.

9. Process according to claim 1 wherein said angle is about 45°.

10. Process according to claim 1, wherein the lubricant consists of an aliphatic liquid and/or an aromatic liquid to which a polyoxyethylene distearate whose polyethylene segment varies between 200 and 5000, is added.

11. Process according to claim 1, wherein the operation is carried out in air containing at most 1% humidity.

12. The process according to claim 6, wherein the thickness of said thin film of lithium is between 5μ and 100μ.

13. The process according to claim 1, comprising an initial tension sufficient to detach said lithium film of reduced thickness at said given point wherein said angle is 90° and thereafter increasing said tension so that said angle is intermediate between 90° and 0°.

14. The process according to claim 13, wherein said angle is maintained so as to optimize the process parameters such as nature of said lubricant, distance between said meeting point of said working rollers, speed of lamination and thickness of said thin film of lithium.

15. The process according to claim 12, wherein said lubricant comprises a volatile organic liquid which is not detrimental to the operation of the cell, does not leave residue on the film, and is used in sufficient quantity to exert a controlled adhesion of said lithium film of reduced thickness on said one working roller.

16. Process according to claim 12, wherein said thin film of lithium has a thickness which is between about 20 µm and about 30 µm.

17. Process according to claim 15, wherein the lamination lubricant comprises an aromatic hydrocarbon.

18. Process according to claim 17, wherein the lamination lubricant consists essentially of toluene.

19. The process according to claim 15, wherein said lubricant further comprises a non-volatile additive which is compatible with lithium, facilitates lamination, and is also compatible with the operation of an electrochemical cell.

20. Process according to claim 19, wherein the volatile organic liquid consists of a mixture of hexanes and toluene.

21. Process according to claim 19, wherein said additive is a polyoxyethylene distearate in which the polyethylene segment varies between 200 and 5000.

22. The process according to claim 1, wherein said working rollers have a surface profile lower than 10µ.

23. The process according to claim 1, wherein the ratio of the thickness of said thin film of lithium to said sheet of lithium is 0.1.

24. The process according to claim 1, wherein the thin film of lithium exits from the rolling machine at a speed up to 50 m/min, and said angle is maintained so as to finely adjust the parameters of the process, such as nature of lubricant, distance between the meeting point of said working rollers, lamination speed and thickness of the film obtained.

25. The process according to claim 24, wherein said speed is 20 m/min.

26. The process according to claim 22, wherein said working rollers are made of polyacetal.

27. The process according to claim 1, wherein said lubricant is electrochemically compatible with lithium and other elements of a polymer electrolyte battery.

\* \* \* \* \*

UNITED STATES PATENT AND TRADEMARK OFFICE
CERTIFICATE OF CORRECTION

PATENT NO. : 5,528,920
DATED : June 25, 1996
INVENTOR(S) : Patrick BOUCHARD, et al.

It is certified that error appears in the above-indentified patent and that said Letters Patent is hereby corrected as shown below:

On the title page, Item [54], and Col. 1, the title, should read:

-- [54] PROCESS FOR LAMINATING A THIN FILM OF LITHIUM BY CONTROLLED DETACHMENT. --

Signed and Sealed this

Twenty-fourth Day of September, 1996

Attest:

BRUCE LEHMAN

*Attesting Officer*   *Commissioner of Patents and Trademarks*